United States Patent
Xu et al.

(10) Patent No.: US 9,982,185 B2
(45) Date of Patent: May 29, 2018

(54) METHODS AND SYSTEMS FOR PREPARING SURFACTANT POLYELECTROLYTE COMPLEXES FOR USE IN SUBTERRANEAN FORMATIONS

(71) Applicant: Multi-Chem Group, LLC, San Angelo, TX (US)

(72) Inventors: Liang Xu, The Woodlands, TX (US); Jayant Rane, Kingwood, TX (US); Kai He, Kingwood, TX (US)

(73) Assignee: MULTI-CHEM GROUP, LLC, San Angelo, TX (US)

( * ) Notice: Subject to any disclaimer, the term of this patent is extended or adjusted under 35 U.S.C. 154(b) by 0 days. days.

(21) Appl. No.: 15/322,996

(22) PCT Filed: Aug. 1, 2014

(86) PCT No.: PCT/US2014/049449
§ 371 (c)(1),
(2) Date: Dec. 29, 2016

(87) PCT Pub. No.: WO2016/018431
PCT Pub. Date: Feb. 4, 2016

(65) Prior Publication Data
US 2017/0130121 A1    May 11, 2017

(51) Int. Cl.
*E21B 43/26* (2006.01)
*C09K 8/68* (2006.01)
(Continued)

(52) U.S. Cl.
CPC .................. *C09K 8/68* (2013.01); *C09K 8/04* (2013.01); *C09K 8/74* (2013.01); *C09K 8/80* (2013.01); *E21B 43/26* (2013.01)

(58) Field of Classification Search
CPC ...... C09K 2208/10; C09K 8/68; C09K 8/516; C09K 8/5751; C09K 8/80; E21B 43/25;
(Continued)

(56) References Cited

U.S. PATENT DOCUMENTS 6,302,209 B1    10/2001 Thompson, Sr. et al.
8,183,184 B2    5/2012 Berkland et al.
(Continued)

FOREIGN PATENT DOCUMENTS

EP    2607405 A1 *    6/2013    ............. C09K 8/516

OTHER PUBLICATIONS

Pojják, K., Bertalanits, E., & Mészáros, R. (2011). Effect of salt on the equilibrium and nonequilibrium features of polyelectrolyte/surfactant association. Langmuir, 27(15), 9139-9147.
(Continued)

*Primary Examiner* — Zakiya W Bates
(74) *Attorney, Agent, or Firm* — Tenley Krueger; Baker Botts L.L.P.

(57) ABSTRACT

Systems and methods for creating surfactant-polyelectrolyte complexes at a well site are provided. In one embodiment, the methods comprise: providing a first solution comprising at least one surfactant and a second solution comprising at least one polyelectrolyte; using a stop-flow mixing apparatus at a well site to mix the first and second solutions to form one or more surfactant-polyelectrolyte complexes; using a low-dose pumping apparatus at the well site to transfer the one or more surfactant-polyelectrolyte complexes from the stop-flow mixing apparatus to a blending apparatus at the well site; using the blending apparatus to mix the one or more surfactant-polyelectrolyte complexes with an aqueous base fluid to form a treatment fluid; and introducing the treatment fluid into a well bore penetrating at least a portion of a subterranean formation at the well site.

20 Claims, 3 Drawing Sheets

(51) Int. Cl.
*C09K 8/74* (2006.01)
*C09K 8/04* (2006.01)
*C09K 8/80* (2006.01)

(58) Field of Classification Search
CPC ........ E21B 43/26; E21B 43/267; E21B 43/16; E21B 43/164; E21B 43/166
See application file for complete search history.

(56) References Cited

U.S. PATENT DOCUMENTS

| | | | |
|---|---|---|---|
| 2002/0023752 A1 | 2/2002 | Qu et al. | |
| 2003/0158269 A1 | 8/2003 | Smith et al. | |
| 2005/0037928 A1 | 2/2005 | Qu et al. | |
| 2007/0144739 A1 | 6/2007 | Fitzgerald | |
| 2011/0009299 A1* | 1/2011 | van Zanten | C09K 8/36 507/129 |
| 2011/0061855 A1 | 3/2011 | Case et al. | |
| 2012/0157356 A1 | 6/2012 | Dawson et al. | |
| 2013/0032345 A1 | 2/2013 | Freese et al. | |
| 2013/0123149 A1 | 5/2013 | Berkland et al. | |

OTHER PUBLICATIONS

Gao, Y., Duc, L. T., Ali, A., Liang, B., Liang, J. T., & Dhar, P. (2013). Interface-Induced Disassembly of a Self-Assembled Two-Component Nanoparticle System. Langmuir, 29(11), 3654-3661.

Xu, Liang. "Weakly Emulsifying Surfactant Reduces Formation Damage and Enhances Well Productivity in Acid Stimulation." SPE Paper 165348, SPE Western Regional & AAPG Pacific Section Meeting 2013 Joint Technical Conference. Society of Petroleum Engineers, 2013.

Philip, J., Prakash, G. G., Jaykumar, T., Kalyanasundaram, P., Mondain-Monval, O., & Raj, B. (2002). Interaction between emulsion droplets in the presence of polymer-surfactant complexes. Langmuir, 18(12), 4625-4631.

Monteux, C., Williams, C. E., Meunier, J., Anthony, O., & Bergeron, V. (2004). Adsorption of oppositely charged polyelectrolyte/surfactant complexes at the air/water interface: formation of interfacial gels. Langmuir, 20(1), 57-63.

Arratia, P. E., Thomas, C. C., Diorio, J., & Gollub, J. P. (2006). Elastic instabilities of polymer solutions in cross-channel flow. Physical review letters, 96(14), 144502.

Soulages, J., Oliveira, M. S. N., Sousa, P. C., Alves, M. A., & McKinley, G. H. (2009). Investigating the stability of viscoelastic stagnation flows in T-shaped microchannels. Journal of Non-Newtonian Fluid Mechanics, 163(1), 9-24.

McDermott, J. J., Kar, A., Daher, M., Klara, S., Wang, G., Sen, A., & Velegol, D. (2012). Self-generated diffusioosmotic flows from calcium carbonate micropumps. Langmuir, 28(44), 15491-15497.

International Search Report and Written Opinion issued in related PCT Application No. PCT/US2014/049449 dated May 1, 2015, 14 pages.

Liquiflow Equipment Company, Application Note to the Field: Minimum Flow Rate for Centrifugal Pumps, available at http://www.liquiflo.com/v2/files/pdf/applicationnotes/2016/AN_1602-4-Minflowrateforcentrifugalpumps.pdf; 1 page.

* cited by examiner

METHODS AND SYSTEMS FOR PREPARING SURFACTANT POLYELECTROLYTE COMPLEXES FOR USE IN SUBTERRANEAN FORMATIONS

CROSS-REFERENCE TO RELATED APPLICATION

The present application is a U.S. National Stage Application of International Application No. PCT/US2014/049449 filed Aug. 1, 2014, which is incorporated herein by reference in its entirety for all purposes.

BACKGROUND

The present disclosure relates to systems and methods for treating subterranean formations using surfactants.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

Surfactants are widely used in treatment fluids for drilling operations and other well treatment operations, including hydraulic fracturing and acidizing (both fracture acidizing and matrix acidizing) treatments. Surfactants may also be used in enhanced or improved oil recovery operations. Many variables may affect the selection of a surfactant for use in such treatments and operations, such as interfacial surface tension, wettability, compatibility with other additives (such as other additives used in acidizing treatments), and emulsification tendency. Surfactant is an important component in treatment fluids for ensuring higher productivity from unconventional oil and gas formations.

However, adsorption of the surfactant onto rock surfaces in a subterranean formation and/or proppant particulates can lead to inefficient use. Adsorption is the adherence of a thin layer of molecules to the surface of a solid. For example, a surfactant with an ionic functional group may adsorb onto a surface of rock in a subterranean formation and/or proppant particle having an opposite ionic charge. When the surfactant adsorbs onto the surface of the rock or proppant, it is no longer available in the treatment fluid for its intended use. Strong adsorption can potentially limit the availability of surfactant in reservoirs as much of the surfactant may be adsorbed near then wellbore before it reaches the interior of the reservoir.

BRIEF DESCRIPTION OF THE DRAWINGS

These drawings illustrate certain aspects of some of the embodiments of the present disclosure, and should not be used to limit or define the claims.

Figure 1:
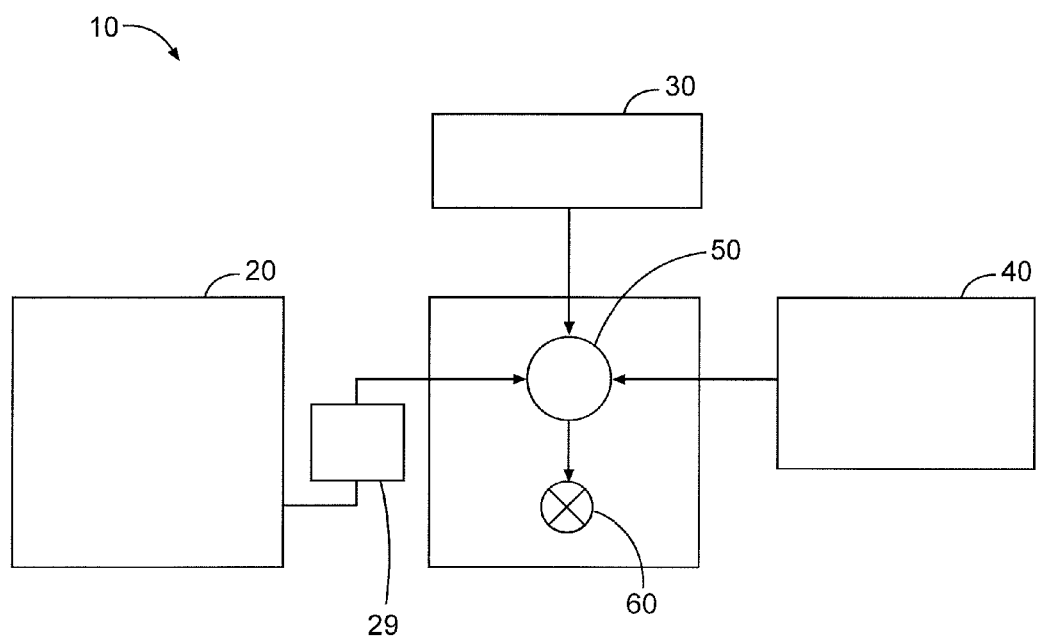
FIG. 1 is a diagram illustrating an example of a well treatment system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF EMBODIMENTS

The present disclosure relates to systems and methods for treating subterranean formations. More particularly, the present disclosure relates to systems and methods for creating surfactant-polyelectrolyte complexes that may enhance surfactant treatments in subterranean formations.

The present disclosure provides methods and systems for creating surfactant-polyelectrolyte complexes (SPCs) for use in subterranean formations and subterranean wells penetrating such formations. In accordance with embodiments of the present disclosure, a surfactant and a polyelectrolyte carrying opposite electrostatic charges are added to a stop-flow mixing apparatus and mixed at an appropriate speed to form one or more SPCs. The mixture is then transferred to a blender at a well site using a low-dose pumping apparatus. The blender then mixes the SPCs into a base fluid (and, optionally, additional additives) to prepare a treatment fluid that may be introduced into at least a portion of a subterranean formation. In certain embodiments, one or more of the aforementioned steps may be performed at a well site, for example, substantially in or near real-time with the treatment and/or operation in which the surfactants are used. The treatment fluids of the present disclosure thus may comprise an aqueous base fluid and one or more surfactant-polyelectrolyte complexes. In certain embodiments, the treatment fluid is a fracturing fluid. However, the teachings of the present disclosure may be used in other treatment or subterranean fluids, including but not limited to, acidizing fluids and drilling fluids.

Without limiting the disclosure to any particular theory or mechanism, the electrostatic attraction between the oppositely charged surfactant and polyelectrolyte may drive the two molecules to form surfactant-polyelectrolyte complexes (SPCs). It is believed that the SPC is kinetically stable and that surfactant molecules may be temporarily trapped by the polyelectrolyte. This in turn may minimize any interactions between the surfactant and other components or additives in a treatment fluid (e.g., proppants) and/or the formation (e.g., charged rock surfaces in the formation) as the surfactant is pumped downhole, and may prevent the surfactant from adsorbing to the surface of the rock or proppant surface. Thus, the surfactant may be pumped deeper into the reservoir, at which point the SPCs may be disassembled or inverted through a variety of mechanisms to release the surfactant molecules. For example, phase equilibrium of polyelectrolyte complex is associated with the salinity; therefore, change of salinity could lead to disassembly of the aggregates. Temperature gradients and/or pH changes may also break up the SPCs and release the surfactant molecules.

Among the many potential advantages to the methods and compositions of the present disclosure, only some of which are alluded to herein, the methods, compositions, and systems of the present disclosure may increase the penetration depth of certain treatment fluids, enabling the treatment of deep and/or dead-end pores in certain rock or formations where conventional treatments may not have been able to deliver surfactants as effectively. The methods and systems of the present disclosure also may provide a means of preparing SPCs for use at a well site immediately or soon after their preparation, which may allow operators to use SPCs in well treatments without the need to transport them to the well site and before they degrade or become unstable. In certain embodiments, the SPCs and/or the polyelectrolytes therein may be used in emulsions to enhance and/or prolong their stability. In certain embodiments, the SPCs may alter the bulk viscoelastic properties of the fluid and/or may induce turbulent flow therein. These viscoelastic properties may be tailored, among other reasons, to engineer flow that increases the contact of a treatment fluid of the present disclosure with oil globules in a subterranean formation (thereby enhancing oil recovery) and/or divert treatment fluids into deeper pores in a subterranean formation. In certain embodiments, charged SPCs may create electric fields in pore spaces in a formation that may act as "micropumps" that enhance diffusiooemotic flow in those pores.

Figure 2:
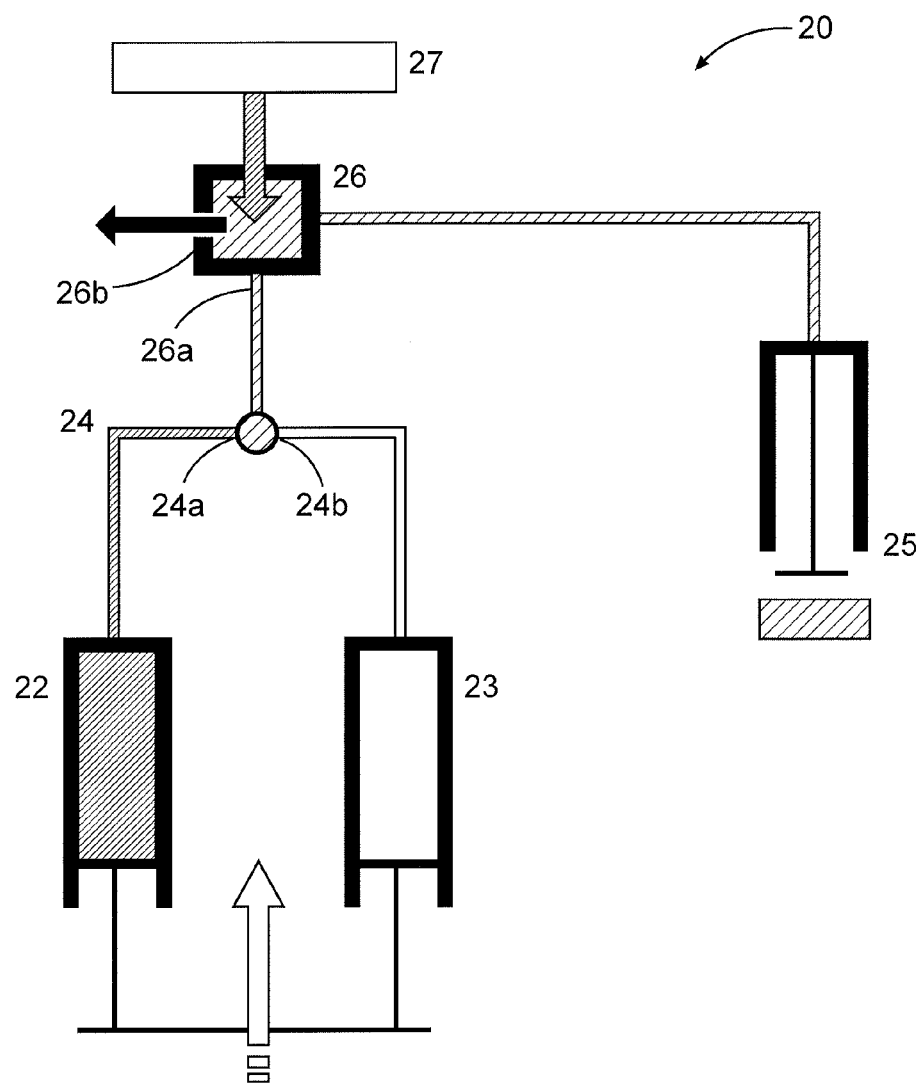
FIG. 2 is a diagram illustrating a stop-flow mixing apparatus that may be used in accordance with certain embodiments of the present disclosure.

Referring now to FIG. 1, a well bore treatment system 10 is illustrated according to certain embodiments of the present disclosure. System 10 includes a stop-flow mixing apparatus 20, a low-dose pumping apparatus 29, a base fluid source 30, a proppant source 40, and a pump and blender system 50, and is disposed at the surface at a well site where a well 60 is located. System 10 may be used to prepare SPCs and/or treatment fluids according to the present disclosure and to introduce those fluids into well 60. The various apparatus in system 10 may be provided at the well site as separate components or equipment, or may be integrated in a single unitary system such as a fracturing blender vehicle. The stop-flow mixing apparatus 20 according to some embodiments is illustrated in further detail in FIG. 2. In certain embodiments, stop-flow mixing apparatus 20 may include similar components to that of laboratory stop-flow mixing apparatuses that are constructed at appropriate scales and with appropriate materials for a well site application. Referring now to FIG. 2, stop-flow mixing apparatus 20 includes at least two syringes 22 and 23 that inject fluids (e.g., solutions comprising surfactant or polyelectrolyte) into one or more inlets 24a and 24b in mixer 24. Mixer 24 may comprise any mixer that provides sufficient shear to mix relatively small volumes of fluids and allow. The mixer includes an outlet 24c through which fluid may flow to an observation cell 26 (through its inlet 26a) and stopping syringe 25. In certain embodiments, as the solutions comprising the surfactant and polyelectrolyte are pushed from syringes 22 and 23, respectively, and through mixer 24, the molecules of the surfactan.t and polyelectrolyte associate to form SPCs. Fluid comprising the SPCs then flows into observation cell 26 and stopping syringe 25 until stopping syringe 25 reaches a predetermined volume (e.g., when the reaction reaches a continuous flow rate). At that volume, the plunger on stopping syringe will stop the flow of liquids through the apparatus 20. Apparatus 20 also includes a measurement device 27 that is configured to monitor the contents of the observation cell 26 using one or more known analytical methods (e.g., UV-visible spectroscopy, FTIR spectroscopy, etc.) and equipment. This device may be used, among other purposes to confirm the formation of SPCs for use in the treatment fluid. The fluid in observation cell 26 then flows out of the stop-flow mixing apparatus 20 through outlet 26b.

Referring back to FIG. 1, fluids comprising SPCs flow out of stop-flow mixing apparatus 20, and are then metered into pump and blender system 50 using a low-dose pumping apparatus 29 coupled between stop-flow mixing apparatus 20 and an inlet of pump and blender system 50. The low-dose pumping apparatus 29 may comprise any liquid dosing or metering pump known in the art that is capable of pumping liquids therethrough in very low concentrations (e.g., less than about 1 gallon per thousand gallons of fluid (gpt), or in some cases, less than about 0.1 gpt). Examples of such devices are pumps equipped with the Micro Motion® meters and measurement devices available from Emerson Process Management.

The proppant source 40 can include a proppant for combination with the fracturing fluid, The pump and blender system 50 receives the base fluid (and any additives premixed into that fluid) from fluid source 30 and combines it with other components, including proppant from the proppant source 40. System 10 optionally may include other tanks, hoppers, or pumps (not shown) that are equipped to dispense additional fluids and/or additives into pump and blender system 50. The resulting mixture may be pumped down the well 60, for example, under a pressure sufficient to create or enhance one or more fractures in a subterranean zone, for example, to stimulate production of fluids from the zone. Notably, in certain instances, stop-flow mixing apparatus 20, base fluid source 30, and/or proppant source 40 may be equipped with one or more metering devices (not shown) to control the flow of fluids, proppants, and/or other compositions to the pump and blender system 50. Such metering devices may permit the pump and blender system 50 can source from one, some or all of the different sources at a given time, and may facilitate the preparation of treatment fluids in accordance with the present disclosure using continuous mixing or "on-the-fly" methods.

The surfactant in the SPCs may comprise any surfactant (or blend of multiple surfactants) known in the art. In some embodiments the surfactant may be anionic, while in other embodiments it may be cationic, or in yet other embodiments, amphoteric, zwitterionic, or non-ionic, respectively. In some embodiments, the desired ionization, if any, of the surfactant may be determined based at least in part upon one or more characteristics of the oil and/or gas of a subterranean formation. For example, the charge of a surfactant of some embodiments of the treatment fluid may allow the surfactant to induce pair interactions (e.g., electrostatic interactions) with one or more molecules of oil and/or gas in the subterranean formation.

Thus, where the oil and/or gas of a subterranean formation contains predominantly alkaline compounds, which are typically positively charged in nature, the surfactant of some embodiments of the present disclosure may be anionic to allow the surfactant to induce electrostatic pair interactions with positively-charged oil and/or gas molecules. In some instances, the oil and/or gas of a subterranean formation may contain a mixture of alkaline and acidic compounds. In such a circumstance, it may be advantageous to use an amphoteric and/or zwitterionic surfactant according to some embodiments of the present disclosure. Furthermore, the amphoteric and/or zwitterionic surfactants of some embodiments may exhibit different charge and/or reactivity at different ranges of pH. For instance, some surfactants that are amphoteric and/or zwitterionic at pH less than about 2 may become anionic, cationic, or non-ionic at pH greater than about 2. Because the downhole pH may change during acidization (for example, pH may rise from levels of from about 0-1 to about 4, as the acid is spent), the characteristics of surfactants of some embodiments may change during the process of an acidization treatment. Other characteristics of oil and/or gas within the formation that might affect the determination of desired surfactant charge include, but are not limited to: weight percentages of saturates, aromatics, resins and asphaltenes.

Examples of anionic surfactants that may be suitable in certain embodiments may include, but are not limited to: sodium, potassium, and ammonium salts of long chain alkyl sulfonates and alkyl aryl sulfonates (such as sodium dodecylbenzene sulfonate); dialkyl sodium sulfosuccinates (such as sodium dodecylbenzene sulfonate or sodium bis-(2-ethylthioxyl)-sulfosuccinate); alkyl sulfates (such as sodium lauryl sulfate); alkyl sulfonates (such as methyl sulfonate, heptyl sulfonate, decylbenzene sulfonate, dodecylbenzene sulfonate); and alkoxylated sulfates. Certain embodiments of the present disclosure may include a combination of anionic surfactants. Examples of non-ionic surfactants that may be suitable in certain embodiments may include, but are not limited to: ethoxylated alcohols and polyglucosides. In some embodiments, non-ionic surfactants may include ethoxylated long-chain alcohols (e.g., ethoxylated dodecanol). Ethoxylation may take place at any point along the alcohol. Examples of cationic surfactants that may be suitable in certain embodiments may include, but are not limited to: alkyl ammonium bromides. In some embodiments, the alkyl chain of the alkyl ammonium bromide may be anywhere from 1 to 50 carbons long, and be branched or un-branched. Thus, an example embodiment may include an alkyl ammonium bromide that comprises a 16-carbon chain alkyl component (e.g., cetyl trimethyl ammonium bromide). Examples of amphoteric and/or zwitterionic surfactants that may be suitable in certain embodiments may include, but are not limited to, hydroxysultaines (e.g., cocoamidopropyl hydroxysultaine, lauramidopropyl hydroxysultaine, lauryl hydroxysultaine, etc.).

The polyelectrolyte in the SPCs may comprise any polyelectrolyte (or blend of multiple polyelectrolytes) known in the art (e.g., any charged molecule with multiple adsorption sites). In certain embodiments, the polyelectrolyte may comprise a polyacrylate. In other embodiments, the polyelectrolyte may comprise poly(styrenesulfonate), poly(styrenesulfonic acid), poly(2-acrylamido-2-methyl-1-propane sulfonic acid), sulfonated poly(ether ether ketone), sulfonated lignin, poly(ethylenesulfonic acid), poly(methacryloxyethylsulfonic acid), poly(acrylic acid), poly(methacrylic acid), HV-sodium alginate, sodium alginate, sodium hyaluronate, heparin sulfate, cellulose sulfate, kappa carrageenan, pentasodium tripolyphosphate, low-esterified pectin (polygalacturonic acid), polyglutamic acid, carboxymethylcellulose, chondroitin sulfate-6, chondroitin sulfate-4, collagen, polyalkylene imines, polyethylene polyamine, polypropylene polyamine, polyvinylamine, polyallylamine, poly(vinylalcohol/vinylamine), chitosan, polylysine, polymyxin, spermine hydrochloride, protamine sulfate, poly (methylene-co-guanidine) hydrochloride, polythethylenimine-ethoxylated, polyethylenimine-ex-ichlorhydrin modified, or any combinations thereof. In certain embodiments, the polyelectrolytes may include any.

The polyelectrolytes used in the methods and compositions of the present disclosure may range in size from a molecular weight of about 100 to about 300,000 Daltons. In some embodiments, the polyelectrolytes may range in size from a molecular weight of about 100 to about 30,000 Daltons. In other embodiments, the polyelectrolytes may range in size from about 1 Å to about 100 µm.

In certain embodiments, the polyelectrolytes and/or surfactants may be mixed in any amount and/or concentration that causes them to form one or more SPCs. In certain embodiments, the relative concentrations of polyelectrolyte and surfactant may be varied, among other reasons, to control the size and/or number of the SPCs formed, to make the SPCs more stable, to increase the reaction rate, and other factors. For example, in certain embodiments, the number of SPCs may be increased by increasing the concentration of the polyelectrolyte relative to the concentration of the surfactant. A person of skill in the art with the benefit of this disclosure will recognize how to vary the amounts and/or concentrations of the polyelectrolytes and/or surfactants to produce SPCs having the desired properties.

In certain embodiments, the polyelectrolytes and/or surfactants may be provided in solutions that are introduced into the stop-flow mixing apparatus for mixing to form the SPCs. The treatment fluids of some embodiments may be aqueous or organic. In certain embodiments, water may be used as a solvent for hydrophilic polyelectrolytes. In other embodiments, organic solvents may be used as a solvent for hydrophobic polyelectrolytes. Examples of organic solvents that may be suitable for certain embodiments include, but are not limited to, methanol, ethanol, ethylene glycol, xylene, toluene, aromatics, butyl glycol, and any combination thereof. In certain embodiments, the solution comprising the polyelectrolyte and/or the solution comprising the surfactant may further comprise one or more salts, among other reasons, to facilitate the formation of the SPCs. In these embodiments, any salt known in the art (e.g., NaCl) may be used.

The methods and systems of the present disclosure may be used to form compositions (e.g., treatment fluids) that may be used to treat a portion of a subterranean formation. The treatment fluids of the present disclosure generally comprise an aqueous base fluid and one or more surfactant-polyelectrolyte complexes. The aqueous base fluid used in some embodiments of the treatment fluids of the present disclosure may comprise fresh water, saltwater (e.g., water containing one or more salts dissolved therein), brine (e.g., saturated saltwater), seawater, or any combination thereof. Generally, the water may be from any source, provided that it does not contain components that might adversely affect the stability of the treatment fluids of the present disclosure. One of ordinary skill in the art, with the benefit of this disclosure, will recognize what components might adversely affect the stability and/or performance of the treatment fluids of the present disclosure.

In forming a treatment fluid comprising SPCs of the present disclosure, the SPCs may be included in an amount sufficient to release a sufficient amount of surfactant to perform the desired treatment in the subterranean formation (e.g., to form one or more relatively short-lived oil-in-acid or oil-in-water emulsions within a subterranean formation). For example, in some embodiments, sufficient SPCs may be included in the treatment fluid to release an amount of surfactant of from about 0.1 to 50 gallons of surfactant per thousand gallons of acid, water, and/or other aqueous base fluid ("gpt"), or put another way, approximately 100 to 50,000 ppm. In other example embodiments, sufficient SPCs may be included in the treatment fluid to release an amount of surfactant of from about 2 to 40 gpt (approximately 2,000 ppm to 40,000 ppm), or in other embodiments, from about 3 to 25 gpt (approximately 3,000 ppm to about 25,000 ppm). In some embodiments, sufficient SPCs may be included in the treatment fluid to release an amount of surfactant of from about 4 gpt to about 18 gpt (approximately 4,000 ppm to 18,000 ppm).

The treatment fluids of the present disclosure may optionally include other components such as acids, salts, solvents, particulates, or other compounds as long as these components do not interfere with the surfactant or the ability of the polyelectrolyte to delay the adsorption of the surfactant. A person of skill in the art with the benefit of this disclosure would be able to select the appropriate other components depending on the desired treatment fluid. For example, the person of skill in the art might include an acid if it is desired to produce an acidizing treatment fluid. A person of skill in the art might also include particulates if it is desired to produce a fracturing fluid with proppant particles.

The treatment fluids of some embodiments may include solvents, such as methanol, ethanol, ethylene glycol, xylene, toluene, aromatics, or butyl glycol. Thus, for example, a treatment fluid of some embodiments may include ethylene glycol mono-butyl ether. The treatment fluids of some embodiments may further include salts, among other reasons, to stabilize the SPCs.

The treatment fluids of some embodiments may further comprise additional surfactants (e.g., in addition to the surfactants provided in the SPCs), among other reasons, to lower the surface tension or capillary pressure of the treatment fluid and allow the fluid to penetrate deeper into a formation or fracture therein. In certain embodiments, the additional surfactant may be included in the treatment fluid in a concentration greater than the critical micelle concentration (CMC) of that surfactant in the fluid.

The treatment fluids of some embodiments may include particulates (such as proppant particulates or gravel particulates) suitable for use in subterranean applications. Particulates suitable for use in the present disclosure may comprise any material suitable for use in subterranean operations. Proppant particulates may be used in conjunction with hydraulic fracturing to prevent the fractures from fully closing upon the release of hydraulic pressure, forming conductive channels through which fluids may flow to the wellbore. Suitable particulate materials include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. The particulate size generally may range from about 2 mesh to about 400 mesh on the U.S. Sieve Series; however, in certain circumstances, other sizes may be desired and will be entirely suitable for practice of the present disclosures. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, are often included in fracturing and sand control treatments. In certain embodiments, the particulates included in the treatment fluids of some embodiments of the present disclosure may be coated with any suitable resin or tackifying agent known to those of ordinary skill in the art.

The treatment fluids of some embodiments may additionally or instead include one or more of a variety of well-known additives, such as gel stabilizers, fluid loss control additives, scale inhibitors, organic corrosion inhibitors, catalysts, clay stabilizers, biocides, bactericides, friction reducers, gases, foaming agents, iron control agents, solubilizers, pH adjusting agents (e.g., buffers), and the like. Those of ordinary skill in the art, with the benefit of this disclosure, will be able to determine the appropriate additives for a particular application.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

In some embodiments, the treatment fluid further comprising an acid may be introduced at a pressure sufficient to cause at least a portion of the treatment fluid to penetrate at least a portion of the subterranean formation, and the treatment fluid may be allowed to interact with the subterranean formation so as to create one or more voids in the subterranean formation (for example, in acidizing treatments). Introduction of the treatment fluid may in some of these embodiments be carried out at or above a pressure sufficient to create or enhance one or more fractures within the subterranean formation (e.g., fracture acidizing). In other embodiments, introduction of the treatment fluid may be carried out at a pressure below that which would create or enhance one or more fractures within the subterranean formation (e.g., matrix acidizing).

Figure 3:
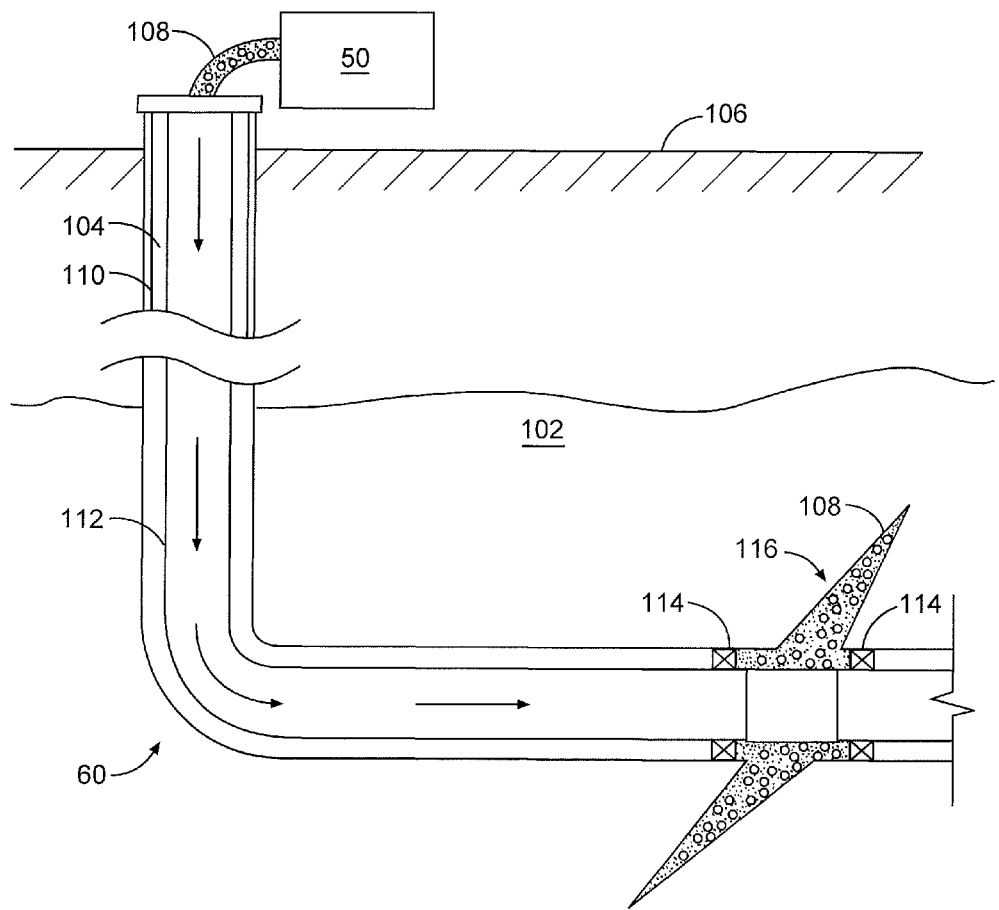
FIG. 3 is a diagram illustrating an example of a subterranean formation in which a fracturing operation may be performed in accordance with certain embodiments of the present disclosure.

For example, FIG. 3 shows the well 60 and treatment system 10 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 3 shows two packers 114, one defining an uphole boundary of the interval and one defining the downhole end of the interval. When the fracturing fluid 108 is introduced into well bore 104 (e.g., in FIG. 3, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising: providing a first solution comprising at least one surfactant and a second solution comprising at least one polyelectrolyte, wherein the surfactant and the polyelectrolyte carry opposite charges; using a stop-flow mixing apparatus at a well site to mix the first and second solutions to form one or more surfactant-polyelectrolyte complexes; using a low-dose pumping apparatus at the well site to transfer the one or more surfactant-polyelectrolyte complexes from the stop-flow mixing apparatus to a blending apparatus at the well site; using the blending apparatus to mix the one or more surfactant-polyelectrolyte complexes with an aqueous base fluid to form a treatment fluid; and introducing the treatment fluid into a well bore penetrating at least a portion of a subterranean formation at the well site.

Another embodiment of the present disclosure is a system for preparing surfactant-polyelectrolyte complexes at a well site comprising: a pump and blender system disposed at a surface of a well bore penetrating at least a portion of a subterranean formation; a stop-flow mixing apparatus having at least a first inlet for receiving a solution comprising a surfactant, a second inlet for receiving a solution comprising an electrolyte, and an outlet through which a solution comprising one or more surfactant-polyelectrolyte complexes flows out of the stop-flow mixing apparatus; a low-dose pumping apparatus coupled between the outlet of the stop-flow mixing apparatus and an inlet of the pump and blender system; and a base fluid source coupled to an inlet of the pump and blender system.

Another embodiment of the present disclosure is a method comprising: providing a first solution comprising at least one surfactant and a second solution comprising at least one polyelectrolyte, wherein the surfactant and the polyelectrolyte carry opposite charges; using a stop-flow mixing apparatus at a well site to mix the first and second solutions to form one or more surfactant-polyelectrolyte complexes, the stop-flow mixing apparatus having an observation cell into which the first and second solutions flow after mixing, and a measurement device configured to monitor the contents of the observation cell, and using the measurement device at the well site to confirm the presence of one or more surfactant-polyelectrolyte complexes in the observation cell; using a low-dose pumping apparatus at the well site to transfer the one or more surfactant-polyelectrolyte complexes from the stop-flow mixing apparatus to a blending apparatus at the well site; using the blending apparatus to mix the one or more surfactant-polyelectrolyte complexes with an aqueous base fluid to form a fracturing fluid; and introducing the fracturing fluid into a well bore penetrating at least a portion of a subterranean formation at the well site at a pressure sufficient to create or enhance one or more fractures within the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a first solution comprising at least one surfactant and a second solution comprising at least one polyelectrolyte, wherein the surfactant and the polyelectrolyte carry opposite charges;
   using a stop-flow mixing apparatus at a well site to mix the first and second solutions to form one or more surfactant-polyelectrolyte complexes;
   using a low-dose pumping apparatus at the well site to transfer the one or more surfactant-polyelectrolyte complexes from the stop-flow mixing apparatus to a blending apparatus at the well site, wherein the low-dose pumping apparatus is capable of transferring a fluid to the blending apparatus at a rate of less than 1 gallon per thousand gallons of fluid mixed in the blending apparatus;
   using the blending apparatus to mix the one or more surfactant-polyelectrolyte complexes with an aqueous base fluid to form a treatment fluid; and
   introducing the treatment fluid into a well bore penetrating at least a portion of a subterranean formation at the well site.

2. The method of claim 1 wherein the treatment fluid is a fracturing fluid, and the fracturing fluid is introduced into the well bore at a pressure sufficient to create or enhance one or more fractures within the subterranean formation.

3. The method of claim 1 wherein:
the stop-flow mixing apparatus comprises an observation cell into which the first and second solutions flow after mixing, and a measurement device configured to monitor the contents of the observation cell, and
the method further comprises using the measurement device to confirm the presence of one or more surfactant-polyelectrolyte complexes in the observation cell.

4. The method of claim 3 wherein the measurement device comprises a UV-visible spectrometer.

5. The method of claim 1 further comprising using the blending apparatus to mix a plurality of proppant particulates with the one or more surfactant-polyelectrolyte complexes and the aqueous base fluid to form the treatment fluid.

6. The method of claim 1 wherein the blending apparatus comprises a pump and blending system, and the treatment fluid is introduced into the well bore using the pump and blending system.

7. The method of claim 1 wherein the surfactant comprises at least one surfactant selected from the group consisting of sodium, potassium, and ammonium salts of long chain alkyl sulfonates and alkyl aryl sulfonates; dialkyl sodium sulfosuccinates; alkyl sulfates; alkyl sulfonates; alkoxylated sulfates; ethoxylated alcohols; polyglucosides; ethoxylated long-chain alcohols; alkyl ammonium bromides; hydroxysultaines; and any combination thereof.

8. The method of claim 1 wherein the polyelectrolyte comprises at least one polyelectrolyte selected from the group consisting of polyacrylate, poly(styrenesulfonate), poly(styrenesulfonic acid), poly(2-acrylamido-2-methyl-1-propane sulfonic acid), sulfonated poly(ether ether ketone), sulfonated lignin, poly(ethylenesulfonic acid), poly(methacryloxyethylsulfonic acid), poly(acrylic acid), poly(methacrylic acid), HV-sodium alginate, sodium alginate, sodium hyaluronate, heparin sulfate, cellulose sulfate, kappa carrageenan, pentasodium tripolyphosphate, low-esterified pectin (polygalacturonic acid), polyglutamic acid, carboxymethylcellulose, chondroitin sulfate-6, chondroitin sulfate-4, collagen, polyalkylene imines, polyethylene polyamine, polypropylene polyamine, polyvinylamine, polyallyamine, poly(vinylalchhol/vinylamine), chitosan, polylysine, polymyxin, spermine hydrochloride, protamine sulfate, poly(methylene-co-guanidine)hydrochloride, polythethylenimine-ethoxylated, polyethylenimine-ex-ichlorhydrin modified, and any combination thereof.

9. The method of claim 1 wherein the polyelectrolyte comprises poly(styrenesulfonic acid).

10. The method of claim 1 wherein the polyelectrolytes have a molecular weight of from about 100 Daltons to about 300,000 Daltons.

11. The method of claim 1 wherein the surfactant comprises one or more alkyl aryl sulfonates.

12. The method of claim 1 wherein the treatment fluid further comprises one or more salts.

13. The method of claim 1 wherein the treatment fluid further comprises one or more additional surfactants.

14. A system for preparing surfactant-polyelectrolyte complexes at a well site comprising:
a pump and blender system disposed at a surface of a well bore penetrating at least a portion of a subterranean formation;
a stop-flow mixing apparatus having at least a first inlet for receiving a solution comprising a surfactant, a second inlet for receiving a solution comprising an electrolyte, and an outlet through which a solution comprising one or more surfactant-polyelectrolyte complexes flows out of the stop-flow mixing apparatus;
a low-dose pumping apparatus coupled between the outlet of the stop-flow mixing apparatus and an inlet of the pump and blender system, wherein the low-dose pumping apparatus is capable of transferring a fluid to the blending apparatus at a rate of less than 1 gallon per thousand gallons of fluid mixed in the blending apparatus; and
a base fluid source coupled to an inlet of the pump and blender system.

15. The system of claim 14 further comprising a proppant source coupled to an inlet of the pump and blender system.

16. The system of claim 14 wherein the stop-flow mixing apparatus further comprises an observation cell disposed between the outlet and the first and second inlets through which a solution mixed by the stop-flow mixing apparatus flows, and a measurement device configured to monitor the contents of the observation cell.

17. The system of claim 16 wherein the measurement device comprises a UV-visible spectrometer.

18. A method comprising:
providing a first solution comprising at least one surfactant and a second solution comprising at least one polyelectrolyte, wherein the surfactant and the polyelectrolyte carry opposite charges;
using a stop-flow mixing apparatus at a well site to mix the first and second solutions to form one or more surfactant-polyelectrolyte complexes, the stop-flow mixing apparatus having an observation cell into which the first and second solutions flow after mixing, and a measurement device configured to monitor the contents of the observation cell;
using the measurement device at the well site to confirm the presence of one or more surfactant-polyelectrolyte complexes in the observation cell;
using a low-dose pumping apparatus at the well site to transfer the one or more surfactant-polyelectrolyte complexes from the stop-flow mixing apparatus to a blending apparatus at the well site, wherein the low-dose pumping apparatus is capable of transferring a fluid to the blending apparatus at a rate of less than 1 gallon per thousand gallons of fluid mixed in the blending apparatus;
using the blending apparatus to mix the one or more surfactant-polyelectrolyte complexes with an aqueous base fluid to form a fracturing fluid; and
introducing the fracturing fluid into a well bore penetrating at least a portion of a subterranean formation at the well site at a pressure sufficient to create or enhance one or more fractures within the subterranean formation.

19. The method of claim 18 further comprising using the blending apparatus to mix a plurality of proppant particulates with the one or more surfactant-polyelectrolyte complexes and the aqueous base fluid to form the fracturing fluid.

20. The method of claim 18 wherein the measurement device comprises a UV-visible spectrometer.

* * * * *